United States Patent

[11] 3,610,701

| [72] | Inventor | Hugh E. Riordan<br>Ann Arbor, Mich. |
|---|---|---|
| [21] | Appl. No. | 873,014 |
| [22] | Filed | Oct. 31, 1969 |
| [45] | Patented | Oct. 5, 1971 |
| [73] | Assignee | Kelsey-Hayes Company<br>Romulus, Mich. |

[54] SKID CONTROL SYSTEM
17 Claims, 1 Drawing Fig.

[52] U.S. Cl. .................................................. 303/21 AF,
188/181 A, 303/21 F, 303/61
[51] Int. Cl. ..................................................... B60t 8/08,
B60t 17/18
[50] Field of Search............................................ 303/21,
61–63, 68, 24, 6; 188/187

[56] References Cited
UNITED STATES PATENTS
| 3,306,677 | 2/1967 | Dewar et al. .................. | 303/21 |
| 3,403,945 | 10/1968 | Dewar et al. .................. | 303/21 |
| 3,414,336 | 12/1968 | Atkin et al. ..................... | 303/21 |
| 3,415,577 | 12/1968 | Walker .......................... | 303/21 |
| 3,449,019 | 6/1969 | Walker .......................... | 303/21 |

Primary Examiner—Milton Buchler
Assistant Examiner—John J. McLaughlin
Attorney—Harness, Dickey & Pierce ABSTRACT: A skid control system adapted for operative association with the fluid actuated braking system of an automotive or similar type vehicle; the system including a modulating valve assembly for selectively controlling the flow or supply of hydraulic brake actuating fluid between the master brake cylinder of the vehicle and one or more of the wheel cylinders thereof; the modulating valve assembly including a piston member movable between positions opening and closing a valve element which is located in a hydraulic circuit communicating hydraulic fluid to the wheel cylinders, an actuator chamber having an actuating assembly movable therein in response to differential pressure conditions and adapted to effect selective actuation of the piston member, and a failure detection and safety valve mechanism which functions to assure that hydraulic fluid is communicated to the wheel cylinders in the event of a failure in the associated system communicating differential pressure conditions to the actuator chamber.

PATENTED OCT 5 1971
3,610,701
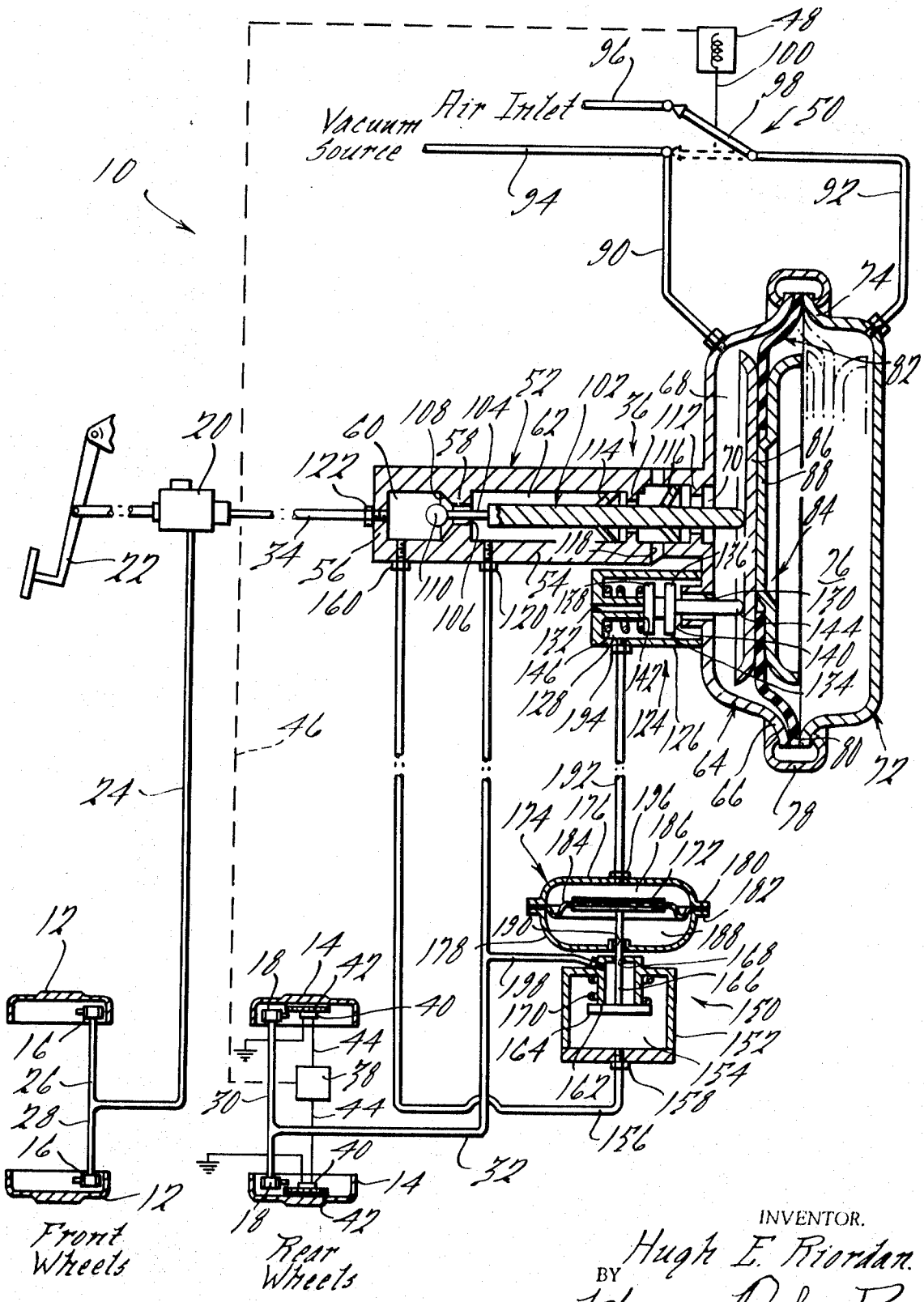
INVENTOR.
Hugh E. Riordan.
BY
Harness, Dickey & Pierce
ATTORNEYS

SKID CONTROL SYSTEM

BACKGROUND OF THE INVENTION

Under certain road conditions, the application of maximum braking pressure, and frequently less than maximum pressure, of automobile and similar type vehicular braking systems results in skidding and a locked-in wheel and/or skid condition. It is, of course, well established that if the wheels of a vehicle are locked or are skidding excessively, the coefficient of friction between the vehicle wheels and the surface of a road over which the vehicle is traveling is reduced, and the effectiveness of the vehicle braking system in decelerating and stopping the vehicle can be substantially reduced. This is especially true for low coefficient of friction road surfaces. It has been theorized that the maximum coefficient of friction, and hence optimum braking efficiency, can be achieved when the vehicle wheels, instead of being in a totally locked or non-rotatable condition, are permitted to slip or partially rotate between 10 and 20 percent, with such wheel slip being defined as the ratio of the difference between the velocity of the car ($V_c$) and the brake wheel velocity ($V_w$) with respect to the car velocity ($V_c$), i.e., $V_c - V_w / V_c$.

Generally speaking, the present invention relates to a vehicle skid control system which is adapted to function in selectively controlling the vehicle braking system such that the operative characteristics simulate, as closely as possible, the ideal braking pressure at which the vehicle may be decelerated and stopped in the minimum amount of time. Accordingly, it is a general function of the skid control system of the present invention to provide a controlled amount of wheel slippage during braking and to positively prevent locked wheel conditions from occurring upon application of maximum braking pressure by the vehicle operator. The skid control system of the present invention achieves such optimum braking characteristics through the utilization of a novel control or modulating valve assembly which functions to selectively control the flow of hydraulic brake actuating fluid from the master cylinder of the vehicle braking system to the various brake wheel cylinders. The modulating valve assembly is preferably vacuum operated and utilizes a novel design which obviates the need for any return spring mechanisms for the actuating piston and valve elements, with the modulating valve assembly being provided with a failure detection and safety valve mechanism which assures that master cylinder fluid will be transmitted to the wheel cylinders even in the event of a failure in the associated vacuum system during a skid control cycle, as will be hereinafter described in detail.

SUMMARY OF THE INVENTION

This invention relates generally to vehicular skid control systems and, more particularly, to a new and improved skid control system incorporating a novel control or modulating valve assembly.

It is accordingly a general object of the present invention to provide a new and improved vehicular skid control system for controlling the braking system of automotive and similar type vehicles.

It is a more particular object of the present invention to provide a new and improved skid control system which utilizes a regulating or control valve which operates independently of any actuator return springs or the like.

It is another object of the present invention to provide a new and improved modulating or control valve of the above character which utilizes a failure detection and safety valve for assuring that master cylinder brake fluid will be transmitted to the associated wheel cylinders even though the primary actuating member of the valve assembly is rendered inoperative.

It is yet another object of the present invention to provide a new and improved modulating or control valve, the actuating medium of which consists of a vacuum source, such as the manifold vacuum of the associated vehicle.

It is a further object of the present invention to provide a new and improved skid control system of the above character which is of a relatively simple design, and hence will have a long and effective operational life.

Other objects and advantages of the present invention will become apparent from the following detailed description, taken in conjunction with the accompanying drawing.

BRIEF DESCRIPTION OF THE DRAWING

The FIGURE is a schematic view of a skid control system embodying the principles of the present invention and illustrates the various component parts of the modulating or control valve incorporated therein in transverse cross section.

DETAILED DESCRIPTION OF A PREFERRED EMBODIMENT

General Description of Environment and Function

Generally speaking, the FIGURE is a schematic diagram of the skid control system, generally designated by the numeral 10, embodying the principles of the present invention and shown in operative association with a vehicular braking system including front and rear brake drums 12 and 14 and associated front and rear brake cylinders 16 and 18, respectively. The skid control system 10 of the present invention, although being adapted for operative association with either pair of front and rear wheel cylinders 16 and 18, or with both pairs thereof, for purposes of simplicity of description, is shown and described in operative association with only the rear wheel cylinders 18 of the vehicular braking system illustrated herein. It will of course, be noted that the skid control system 10 of the present invention may be readily utilized in connection with various types of braking systems other than the vehicular braking system shown and described herein, and may also find particularly useful application, for example, in aircraft braking systems well known in the art.

The aforementioned vehicular braking system comprises a master cylinder assembly 20 which is operable in response to actuation of a conventional foot or brake pedal 22 to communicate hydraulic braking fluid therefrom through fluid conduits or lines 24, 26 and 28 to the front wheel cylinders 16. The rear wheel cylinders 18 are operatively connected by means of a common fluid conduit 30 which is in turn connected through another fluid conduit 32 to skid control system 10 of the present invention. The master cylinder 20 is connected to the skid control system 10 through a suitable fluid conduit or line 34, as will hereinafter be described in detail. It will be noted that the vehicle brakes associated with the brake drums 12, 14 may be of any conventional design, the construction and operation of which are well known in the art and hence the details thereof have been omitted for purposes of simplicity of description.

The skid control system 10 of the present invention comprises a modulating valve assembly, generally designated 36, that is actuatable in accordance with and in response to an electrical signal produced by an electrical control module 38. The module 38 receives information from suitable means, such as sensors 40 associated with each of the brake drums 14, for example, through suitable exciter rings 42. The exciter rings 42 and sensors 40 may be of any construction well known in the art, and since these members constitute no material part of the present invention, the specific details concerning the construction and operation thereof have been omitted. By way of example, the exciter rings 42 may be of a toothed construction, and the sensors 40 may be of a permanent or electromagnetic construction which together define a variable reluctance pickup. During normal operation of the associated wheels, the exciter rings 42 would be rotated concomitantly with the brake drums 14, and hence simultaneously with the associated vehicle wheels, and by virtue of their toothed construction, the rings 42 would, via the sensors 40, produce electrical signals which are transmitted through associated conductors 44 to the control module 38, thus providing a signal to the module 38 responsive to the rotational velocity of the vehicle wheels associated with the brake drums 14.

The control module 38 is designed and constructed to sense the rate of change in the signals received through the conductors 44, and hence to sense the rate of deceleration of the wheels associated with the brake drums 14, and to produce an output signal responsive to the magnitude of the deceleration of the wheels associated with the brake drums 14 reaching a preselected magnitude corresponding to a skid condition existing or about to be occurring at said wheels. The output or control signal is adapted to be transmitted from the control module 38 through a suitable conductor 46 to a solenoid 48 that controls selective actuation of a valve assembly, generally designated by the numeral 50, which in turn controls the transmission of differential pressure conditions from a suitable atmospheric air inlet and a source of vacuum pressure to the modulating valve assembly 36. In the system of the present invention, the control module 38 can provide merely an "on" or "off" signal and modulation of the fluid pressure to the brake cylinders 14 will be provided by the valve assembly 36. It will be noted that in some skid control systems, the fluid pressure to the vehicle brakes is varied in response to an output signal of varying magnitude; however, in the present invention, the fluid pressure is varied or controlled by the valve assembly 36 in response to a signal of substantially constant amplitude which permits the remainder of the system to be considerably simplified.

CONSTRUCTION AND OPERATION OF MODULATING VALVE ASSEMBLY

For purposes of clarity, the terms "inwardly," "outwardly" and derivatives thereof will have reference to the geometric center of the modulating valve assembly 36 of the present invention and the various component parts thereof. Similarly, the terms "forwardly" and "rearwardly" will have reference to the assembly 36 as shown in the drawing, with the forward and rearward ends thereof being located at the left and right sides, respectively, thereof.

In general, the modulating valve assembly 36 comprises an elongated housing 52 comprising a sidewall section 54 that is closed at the forward end thereof by a suitable end wall section 56. Disposed interiorly of the housing 52 is an inwardly extending shoulder or partition section 58 which divides or separates the housing interior into forward and rearward cavities or chambers 60 and 62, respectively. The end of the housing 52 opposite that at which the wall section 56 is located is connected to the central portion of a generally cup-shaped enclosure member 64 which is formed with a generally outwardly flared or projecting edge portion 66 and defines an internal volume 68 which is communicable through a passage 70 with the chamber 62, as illustrated. The enclosure member 64 is operatively associated with a substantially identical enclosure member 72 having a generally outwardly flared edge portion 74 and defining an internal volume 76. The enclosure members 64, 72 are adapted to be positioned in the manner illustrated in the drawing and be fixedly secured to one another by means of a suitable annular retaining or connecting rim 78 that extends around the flared edge portions 66, 74 thereof, with the outer peripheral edge portion 80 of a flexible resilient annular diaphragm member 82 being compressingly engaged between the edge portions 66, 74 to provide a fluidtight seal or joint at the juncture of the outer edges the members 64, 72. The diaphragm member 82 extends inwardly from the edge portions 66, 74 and is adapted to be secured to an actuator assembly 84 consisting of a pair of plates 86 and 88 that clampingly engage the forward and rearward sides, respectively, of the inner periphery of the diaphragm member 82. It will be noted that the size of the member 82 is designed such that the assembly 84 is free to move between the solid line and phantom line positions in the FIGURE during operation of the skid control system 10, as will later be described.

The interior volumes 68 and 76 within the enclosure members 64, 72 and separated by the diaphragm member 82 and assembly 84 are adapted to be selectively communicated with a vacuum pressure source, such as might be provided by the manifold vacuum of the associated vehicle engine, whereby to control and effect movement of the assembly 84 between the solid and dotted line positions shown in the drawing. More particular, the volume 68 is adapted to be communicated through a suitable vacuum line or conduit 90 with the valve assembly 50, while the volume 76 is adapted to be communicated with the same valve assembly 50 through a suitable vacuum line or conduit 92. The assembly 50 itself is communicable through a suitable vacuum line 94 with the aforementioned vacuum source and through a suitable air inlet line 96 with a suitable source of air at atmospheric pressure. The assembly 50 comprises a suitable movable valve member 98 which is schematically shown in the drawing and is adapted to move between the solid line and dotted line positions shown therein and function such that when in the solid line position, to communicate the vacuum line 94 with the conduit 92 and hence with the volume 76, and when in the dotted line position, to communicate the air inlet conduit 96 with the vacuum line 92 and volume 76. The valve member 98 is adapted to be actuated by means of the aforementioned solenoid 48 and be normally disposed in the solid line position and be movable through a suitable connecting link or armature 100 of the solenoid 48 to the dotted line position upon receipt by the solenoid 48 of the aforementioned control signal from the control module 38. Hence, during normal operation of the vehicle, the vacuum source will be communicated with the volume 68 through the conduits 94, 90 and the volume 76 will be communicated with the atmosphere through the conduits 92, 96 and valve member 98, which results in the pressure on the rearward side of the assembly 84 exceeding that on the forward side thereof, thereby causing the assembly 84 to normally assume the solid line position shown in the FIGURE. At such time as the control module 38 transmits a control signal through the conductor 46 to energize the solenoid 48, the armature 100 will bias the valve member 98 to the dotted line position shown in the FIGURE, thereby opening the circuit to the air inlet 96 and completing a circuit through the conduits 94, 92 and valve member 98 of the vacuum source with the volume 76. This results in the vacuum source being communicated to both sides of the assembly 84 so that identical pressure conditions will exist on the forward and rearward sides thereof so as to permit the assembly 84 to be moved to the dotted line position under the influence of some rearwardly directed force hereinafter to be described. At such time as the control signal terminates, the solenoid 48 will bias the valve member 98 from the dotted line position to the solid line position, thereby again connecting the air inlet with the volume 76 to force the assembly 84 toward the solid line position shown in the FIGURE.

Disposed within the chamber 62 of the housing 52 is an elongated piston member 102 which comprises a reduced diameter, forwardly extending portion 104 that extends through a central aperture or opening 106 formed in the partition section 58 of the housing 52. The forward end of the aperture 106 is formed with a generally tapered counterbore which defines a valve seat 108 that is adapted to be engaged by a spherical checklike valve member 110, whereby to block fluid flow from the chamber 60 to the chamber 62. In operation of the modulating valve assembly 36, the piston member 102 is adapted to move forwardly, whereby the portion 104 thereof will engage the check valve 110 and bias the same forwardly and away from the valve seat 108 to permit fluid flow between the chambers 60 and 62, as will later be described. The end of the piston member 102 opposite the portion 104 thereof is adapted to extend through the passage 70 and into the volume 68 and engage the forward side of the plate 86 of the actuating assembly 84. The length of the piston member 102 is designed such that when the assembly 84 is in the solid line position shown in the FIGURE, the check valve member 110 will be maintained out of engagement with the valve seat 108, and when the assembly 84 moves to the dotted line position in the FIGURE, the piston member 102 will be free to move rearwardly and thereby permit the check valve 110 to engage the valve seat 108. Means in the form of one or more abutments or stops 112 may be provided within the inner periphery of the rearward end of the chamber 62 and be engageable by suitable guide and sealing means 114 and 116 provided on the piston member 102 for limiting rearward movement of the piston member 102 within the chamber 62. Suitable bleed openings 118 may be provided in the sidewall section 54 of the housing 52 interjacent the stop means 112, as will be apparent.

One end of the conduit 32 is connected through suitable fitting means 120 with the interior of the chamber 62, while one end of the conduit 34 is connected through suitable fitting means 122 with the interior of the chamber 60 so that at such time as the check valve 110 is biased out of engagement with the valve seat 108 by the piston member 102, fluid communication is provided from the master cylinder 20, through the conduit 34, chambers 60, 62 and conduit 32 with the rear wheel cylinders 18, and that at such time as the check valve 110 engages the valve seat 108, fluid communication between the master cylinder 20 and rear wheel cylinders 18 through the aforesaid circuit is precluded.

Disposed on the enclosure member 64 directly below the housing 52 is a failure detection valve mechanism, generally designated 124, which consists of an annular housing 126 defining an internal cavity 128 that is communicable through a suitable passage 130 with the interior of the volume 68. The interior of the cavity 128 is also communicable through a relatively small diameter orifice 132 with the atmosphere, the size of which orifice 132 is adapted to be carefully selected for purposes later to be described. Disposed interiorly of the cavity 128 is a spoollike valve member 134 having a pair of spaced valve elements 136 and 138 that are adapted to seat against and sealingly engage a pair of annular valve seats 140 and 142, whereby to selectively block communication between the cavity 128 and passage 130, and between the cavity 128 and the orifice 132, respectively. The valve member 134 is provided with a probe or actuating finger 144 which extends through the passage 130 and is adapted to abuttingly engage the forward side of the plate 86 of the assembly 84, with a suitable helical coil spring 146 being provided for exerting a rearwardly directed force against the valve member 134 and thereby assuring positive engagement of the finger 144 with the assembly 84 and sealing engagement of the valve element 136 with the valve seat 140. The length of the finger 144 is selected such that when the assembly 84 is in the solid line position in the FIGURE, the valve element 138 is sealingly engaged with the valve seat 142, and disengaged with the valve seat 140, whereby to communicate the vacuum conditions within the volume 68 through the passage 130 with the cavity 128; however, when the assembly 84 moves to the dotted line position in the FIGURE, the spring 146 will bias the valve member 134 rearwardly so as to sealingly engage the valve element 136 with the valve seat 140 and thereby communicate atmospheric conditions through the orifice 132 with the cavity 128.

The skid control system 10 of the present invention comprises a safety valve assembly, generally designated 150, which consists of a valve housing 152 defining an internal chamber 154. The chamber 154 is communicable with a fluid conduit or line 156 which is connected to the housing 152 by suitable fluid means 158 and to the housing 52 through suitable fluid means 160 which communicates with the interior of the chamber 60, thereby providing for fluid communication between the chamber 60 and chamber 154. Disposed within the interior of the chamber 154 is an annular valve seat 162 which is adapted to be selectively engaged by a generally disk-shaped valve member 164 connected to one end of an elongated linkage or rod member 166 that extends upwardly through a suitable opening or bore 168 formed in the upper end of the housing 152. A helical coil spring 170 extends between the upper side of the valve member 164 and the upper side of the valve housing 152 and is adapted to exert a resilient downwardly directed force against the valve member 164 and thereby function to urge the same away from the valve seat 162. The upper end of the rod member 166 is connected to an actuating plate assembly 172 disposed within an actuator chamber, generally designated 174, and comprising a pair of generally cup-shaped housings 176 and 178 which may be similar in construction to the enclosure members 64 and 72 hereinbefore described. The housing sections 176, 178 are provided with outwardly directed peripheral edge or flange portions 180 and 182, respectively, which are adapted to clampingly engage the upper and lower sides of a resilient flexible diaphragm member 184, the inner periphery of which is adapted to be fixedly secured to the assembly 172, with the diaphragm member 184 and assembly 172 dividing the interior of the chamber 174 and to upper and lower compartments 186 and 188, respectively. It will be seen that the housing section 178 is formed with an enlarged bore or opening 190 in the lower side thereof through which the rod member 166 extends, the opening 190 being slightly larger in cross section than the member 166, whereby the interior of the compartment 188 is vented to the atmosphere through the annulus defined between the rod member 166 and the periphery of the bore 190. The compartment 186 is communicable with the cavity 128 through a suitable conduit or line 192 which is connected at the upper end thereof through suitable fluid fitting means 194 with the housing 126 and at the lower end thereof through suitable fitting means 196 with the housing section 176.

OPERATION OF THE ENTIRE SYSTEM

In operation of the skid control system 10 of the present invention, assuming the initial connection of the various component parts of the valve assemblies 36 and 150 are as is illustrated in the FIGURE, at such time as the vehicle brakes are applied under conditions wherein a wheel skid becomes imminent, the control module 38 will transmit a control signal through the conductor 46 to the solenoid 48. Receipt of this signal by the solenoid 48 results in actuation of the valve member 98 and movement thereof from the solid line position to the dotted line position, wherein the vacuum source will be communicated to both of the volumes 68 and 76. Due to the line pressure within the chamber 62 of the housing 52, the piston member 102 will be biased rearwardly in the FIGURE, thereby moving the assembly 84 from a solid line position to the dotted line position and permitting the check valve member 110 to engage the valve seat 108 so as to block fluid communication from the chamber 60, through the passage 106 and into the conduit 32. Additionally, as the piston member 102 moves rearwardly, the volume within the chamber 62 will increase to relieve the fluid pressure transmitted to the rear wheel cylinders 18, thereby permitting the rear wheels of the vehicle to spin-up.

At such time as the rear wheels of the vehicle have had an opportunity to spin-up or rotate to a preselected speed, the control signal from the module 38 to the solenoid 48 will terminate, at which time the valve member 98 will be biased from the dotted line position to the solid line position so that atmospheric air will be transmitted into the interior of the volume 76, thereby biasing the assembly 84 forwardly. As the assembly 84 moves forward, the plate 86 will engage the rearward end of the piston member 102, thereby moving the member 102 forwardly so that the reduced diameter portion 104 thereof engages the check valve member 110 and biases the same out of engagement with the valve seat 108 to provide for fluid flow from the chamber 60 to the chamber 62, thereby causing pressure to be reapplied to the rear wheel cylinders 18.

Referring now to the operation of the failure detection valve 124 and safety valve assembly 150, it will be seen that during normal operation of the vehicle, the assembly 84 will be engaged with the finger 144, thereby maintaining the valve element 136 disengaged from the valve seat 140 and the valve element 138 engaged with the valve seat 142 against the resistance of the spring 146, and thereby blocking the flow of atmospheric air through the orifice 132. Accordingly, the vacuum conditions prevalent within the chamber 68 will be communicated through the passage 130 and conduit 192 into the compartment 186. Due to the fact that the pressure in the compartment 186 will be substantially less than the atmospheric conditions in the compartment 188, (due to the latter compartment 188 being vented through the bore 190), the assembly 172 will be disposed in the position shown in the FIGURE wherein the valve 164 is engaged with the valve seat 162 to prevent any fluid flow between the valve member 164 and valve seat 162. At such time as the assembly 84 moves to the dotted line position shown in the FIGURE, e.g., during a skid control condition, the spring 146 will bias the valve member 134 rearwardly, thereby engaging the valve element 136 with the valve seat 140 and disengaging the valve element 138 from the valve seat 142 so that the vacuum condition within the chamber 68 will be prevented from being transmitted into the cavity 128, and atmospheric conditions may be communicated through the orifice 132 into the cavity 128. When this occurs, the atmospheric conditions within the cavity 128 will be communicated through the conduit 192 into the compartment 186, wherein the pressure conditions on the upper and lower sides of the assembly 172 will be equalized. In this situation, the spring 170 will act to bias the valve member 164 downwardly or away from engagement with the valve seat 162, wherein the chamber 154 is communicable through a suitable conduit 198 with the conduit 32, with the result that hydraulic fluid is free to flow from the chamber 154 through the conduit 198 and conduit 32 to the rear wheel cylinders 18.

The purpose of the above arrangement is to provide a flow passage or circuit to communicate hydraulic brake fluid from the master cylinder 20 to the rear wheel cylinders 18 in the event there is a failure in the vacuum system with which the line 94 is communicable. That is, in the event that the vacuum system is rendered inoperative during the course of a skid control condition, wherein the check valve member 110 is closed and the assembly 84 is disposed in a dotted line position, the valve member 164 will be disengaged from the valve seat 162 so that pressurized fluid is free to flow from the line 34, through the chamber 60 and line 156 into the chamber 154, which fluid will then flow through the conduit 198 and conduit 32 to the wheel cylinders 18. Thus, even though the vacuum system may for some reason fail during the progress of the skid control cycle, hydraulic brake fluid will be transmitted to the rear wheel cylinders 18 so as to render the rear wheels of the vehicle operative to decelerate the vehicle. At such time as the vacuum system becomes operative and the skid control cycle terminates, as above described, the assembly 84 will be biased from the dotted line position to the solid line position, thereby moving the valve member 134 to the position illustrated in the FIGURE to block the flow of atmospheric air through the orifice 132 and into the compartment 186, with the result that the differential pressure conditions across the assembly 172 will cause the valve member 164 to become engaged with the valve seat 162 to block fluid flow from the chamber 154 to the rear wheel cylinders 18.

A particularly important feature of the present invention resides in the fact that the size of the orifice 132 may be selectively controlled to vary the time delay before the valve member 164 is opened to supply fluid to the brake cylinders 18 during a skid control cycle. Thus, by properly controlling the cross-sectional size of the orifice 132, the particular time at which the rear cylinders 18 will become actuated after a failure in the vacuum system, may be carefully controlled. Another feature of the present invention resides in the fact that the modulating valve assembly 36 is designed to operate without the use of any return springs or the like, thereby simplifying to the extreme the number of component parts and attendant assembly problems involved therewith, the use of such return springs being a particularly bothersome problem in the past due to the fact that the size and spring characteristics thereof has had to be carefully selected to assure positive movement of the associated piston or similar actuating member so that hydraulic fluid is rapidly transmitted to the wheel cylinders at the termination of a skid control cycle. Yet another feature of the present invention resides in the fact that the modulating assembly 36 is adapted to be operated through the sole power of the manifold vacuum or other suitable vacuum source as is commonly available on automotive vehicles, thereby obviating the need for any auxiliary fluid pressure sources, sources of electrical energy or the like.

While it will be apparent that the preferred embodiment illustrated herein is well calculated to fulfill the objects above stated, it will be appreciated that the present invention is susceptible to modification, variation and change without departing from the scope of the invention.

I claim:
1. In a skid control system for controlling the fluid pressure applied to the brakes of at least one wheel of a wheeled vehicle from a source of brake actuating fluid,
   a modulating valve assembly comprising,
     pressure control means including a first valve element and piston means movable between positions opening and closing said first valve element for controlling the magnitude of the pressure of the brake actuating fluid applied to the brakes,
     actuating means for operating said piston means,
     said actuating means including a vacuum chamber having a movable diaphragm therein, a vacuum source selectively communicable with said chamber, whereby said diaphragm is movable between actuated and deactuated positions in response to differential pressure conditions thereacross, and
     vacuum operated means operable in response to preselected movement of said diaphragm for communicating fluid from the source thereof to the one wheel brake independently of said pressure control means.
2. The invention as set forth in claim 1 which includes control means providing an output signal in response to the existence of a skid control at the one wheel, said diaphragm being movable to said actuated position when one side thereof is exposed to a first pressure condition and the opposite side thereof is exposed to a second pressure condition.
3. The invention as set forth in claim 1 which includes time delay means for controlling operation of said last mentioned means a preselected time interval after said actuating means is rendered inoperative.
4. The invention as set forth in claim 3 wherein said time delay means comprises valve means actuatable in response to movement of said diaphragm.
5. The invention as set forth in claim 4 which includes orifice defining means and means supporting said valve means for movement for opening and closing said orifice defining means.
6. The invention as set forth in claim 5 wherein one side of said diaphragm is communicable with said vacuum source and the opposite side thereof communicable with the atmosphere, said orifice being communicable with said vacuum operated means including another valve member opening and closing a circuit communicating fluid from the source thereof to the one wheel brake independently of said pressure control means.
7. The invention as set forth in claim 1 which includes means for detecting failure of said actuating means.
8. The invention as set forth in claim 7 wherein said failure detecting means comprises valve means movable in response to movement of said diaphragm.
9. In a skid control system for controlling the fluid pressure applied to the brakes of at least one wheel of a wheeled vehicle from a source of brake actuating fluid,
   a modulating valve assembly comprising, pressure control means including piston means movable between actuated and deactuated positions for controlling the magnitude of the pressure of the brake actuating fluid supplied to the brakes, said pressure control means having a first condition for relieving the fluid pressure to the brakes and a second condition not relieving the fluid pressure to the brakes, actuating means for moving said piston means between said positions, said actuating means including a chamber communicable with a vacuum source and means movable within said chamber in response to differential pressure conditions communicated thereto, and valve means normally maintained in a closed position by being communicable with said vacuum source, but being movable to an open position to communicate fluid from said fluid source to the one wheel brake independently of said pressure control means.

10. The invention as set forth in claim 9 wherein said valve means includes time delay means for communicating fluid to the one wheel brake a preselected time interval after said actuating means is rendered inoperative.

11. The invention as set forth in claim 10 wherein said time delay means comprises a valve member exposed on one side thereof to the atmosphere and at the opposite side thereof to said vacuum source, and which further includes an orifice communicable with said one side of said valve member normally exposed to said vacuum source.

12. The invention as set forth in claim 9 including a check valve for selectively blocking communication between first and second compartments in said modulating valve assembly.

13. The invention as set forth in claim 12 wherein said valve means is actuatable in response to the pressure conditions in said chamber.

14. The invention as set forth in claim 13 which includes orifice means for selectively opening and closing said valve means.

15. The invention as set forth in claim 14 which includes a spool valve member movable to a first position communicating said orifice means with said valve means and to a second position communicating said vacuum source with said valve means.

16. The invention as set forth in claim 9 wherein said piston means is movable between said actuated and deactuated positions independent of any return spring means.

17. In a skid control system for controlling the fluid pressure applied to the brakes of at least one wheel of a wheeled vehicle from a source of brake actuating fluid, a modulating valve assembly including a first valve means and a piston movable between first and second positions causing opening and closing of said valve means, a vacuum chamber having a diaphragm movable therein and adapted to effect preselected movement of said piston, said chamber being communicable with a vacuum source, first fluid circuit means communicating said source of fluid to the brakes and controlled in part by said first valve means, second fluid circuit means for communicating fluid from said source to the one wheeled brake independently of said modulating valve assembly, and second valve means for controlling fluid flow through said second circuit means, said second valve means normally being maintained in a closed condition under the influence of said vacuum source and being movable to an open condition in response to preselected movement of said diaphragm.